United States Patent
Itkin et al.

(10) Patent No.: US 9,356,631 B2
(45) Date of Patent: May 31, 2016

(54) SYSTEMS AND METHODS FOR ENHANCING PROBABILITY OF INTERNAL MEASUREMENTS IN CROWDED ENVIRONMENTS

(71) Applicant: Intel IP Corporation, Santa Clara, CA (US)

(72) Inventors: Grigory Itkin, Munich (DE); Thorsten Tracht, Munich (DE)

(73) Assignee: Intel IP Corporation, Santa Clara, CA (US)

( * ) Notice: Subject to any disclaimer, the term of this patent is extended or adjusted under 35 U.S.C. 154(b) by 18 days.

(21) Appl. No.: 14/276,555

(22) Filed: May 13, 2014

(65) Prior Publication Data

US 2015/0333779 A1    Nov. 19, 2015

(51) Int. Cl.
*H03C 1/52* (2006.01)
*H04B 1/04* (2006.01)
*H04B 17/00* (2015.01)

(52) U.S. Cl.
CPC .......... *H04B 1/0475* (2013.01); *H04B 17/0015* (2013.01)

(58) Field of Classification Search
CPC .................... H04B 1/0458; H01Q 9/0442
USPC ............ 455/107; 333/124; 343/850, 860, 861
See application file for complete search history.

(56) References Cited

U.S. PATENT DOCUMENTS

| | | | |
|---|---|---|---|
| 2013/0038502 A1* | 2/2013 | Erdem | 343/861 |
| 2013/0208631 A1* | 8/2013 | Dufrene | 370/277 |

* cited by examiner

*Primary Examiner* — Lee Nguyen
(74) *Attorney, Agent, or Firm* — Eschweiler & Associates, LLC

(57) ABSTRACT

A communication system having self or internal calibration is disclosed. The system includes an antenna tuner, a mismatch component, a receiver, and a strength indicator. The antenna tuner is configured to mismatch an antenna according to a mismatch code. The mismatch code includes or alters antenna characteristics of the antenna. The mismatch component is configured to provide the mismatch code to the antenna tuner. The strength indicator is configured to measure a strength of the received signal.

12 Claims, 8 Drawing Sheets

SYSTEMS AND METHODS FOR ENHANCING PROBABILITY OF INTERNAL MEASUREMENTS IN CROWDED ENVIRONMENTS

BACKGROUND

One challenge facing mobile devices is interference from other devices, such as mobile phones and base stations. In particular, crowded environments, such as airports, large cities, and the like have even more noise and, as a result, more interference.

One technique to account for the interference is to perform some type of internal calibration. The internal calibration attempts to account for the interference and isolate mobile devices from their environment. However, in crowded environments, the interference and level of interference makes internal calibration difficult or impossible to perform. For example, other base stations can generate strong signals that result in large amounts of interference. As a result, internal calibration may not be possible and mobile communication can be substantially degraded.

What is needed is a technique to permit and perform suitable internal calibration in crowded environments.

DETAILED DESCRIPTION

Figure 1:
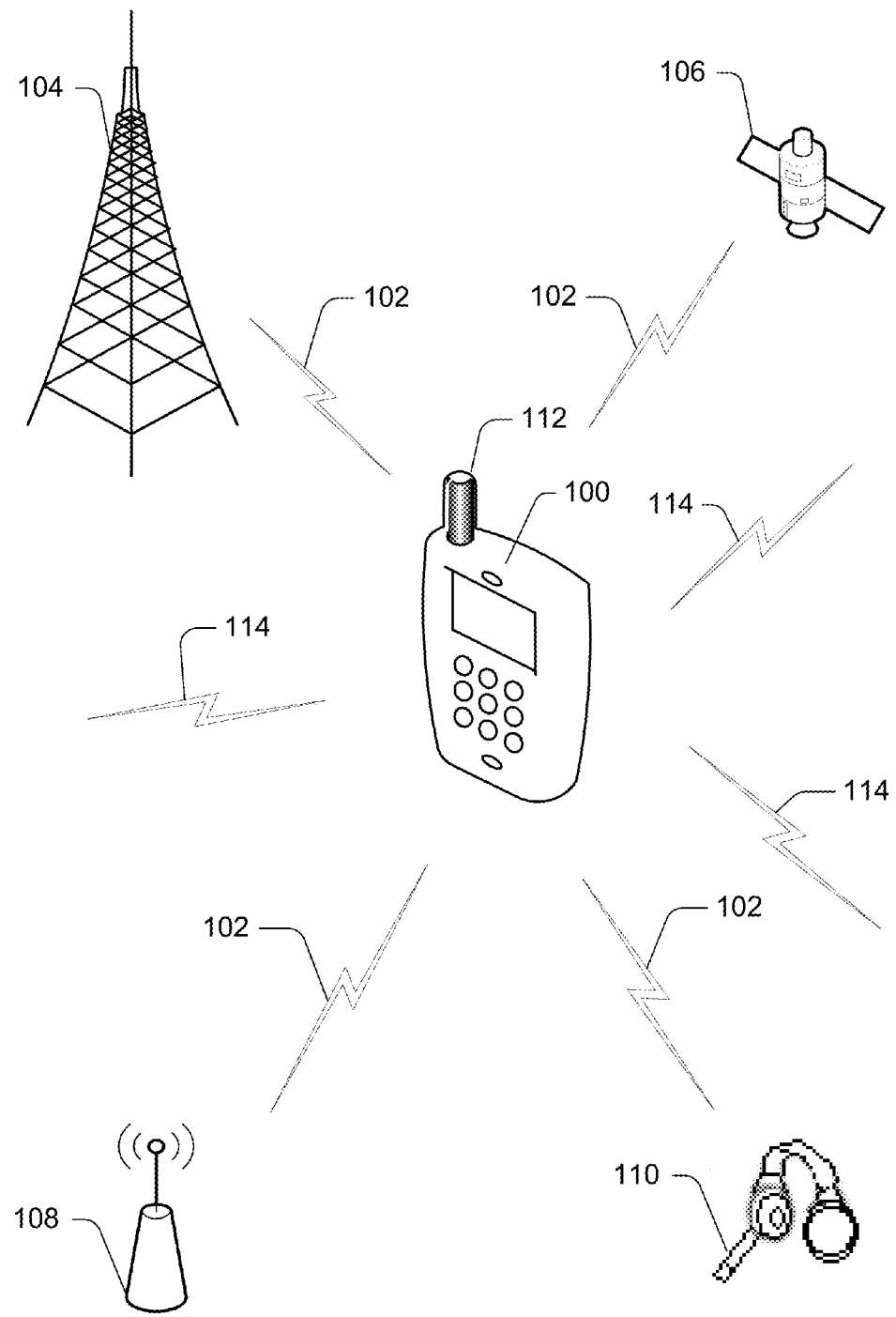
FIG. 1 is a diagram of an example wireless device that is operable to send and receive signals while in crowded environments.

The systems and methods of this disclosure are described with reference to the attached drawing figures, wherein like reference numerals are used to refer to like elements throughout, and wherein the illustrated structures and devices are not necessarily drawn to scale.

A challenge facing mobile devices is interference from other devices, such as mobile phones and base stations. In particular, crowded environments, such as airports, large cities, and the like have even more noise and, as a result, more interference. This type of interference is also referred to as intermodulation distortions because it is due to multiple modulated signals.

A technique to account or overcome the interference or noise is to perform different internal calibrations, such as intermodulation calibration and second order intermodulation calibration (IM2). The calibration generally adjusts transmission and reception characteristics, such as frequency bands, power levels, and the like in order to mitigate the interference, including intermodulation distortions. The calibration can be performed and/or re-performed when the operating environment changes. For example, moving from a home to an office, or moving from one airport to another.

In crowded environments, such as airports and big cities, a large number of base stations and/or other devices are transmitting. The level of interference can be sufficiently large to prevent or hamper internal calibration and make degrade or prohibit mobile communication.

Systems and methods are included that mitigate the interference, including large amounts of interference in crowded environments, and permit suitable internal calibration to enhance communications and range. Generally, for internal or self calibrations, a receiving antenna is mismatched via an antenna tuner to mitigate or reduce levels of noise/interference. Subsequently, the internal calibration, such as second order intermodulation (IM2) calibration is performed. Thereafter, communication is performed with enhanced performance and mitigated interference.

FIG. 1 is a diagram of an example wireless device 100 that is operable to send and receive signals 102 while in crowded environments. The device 100 utilizes communication technologies, e.g., GSM, UMTS, and so forth, for communication with communications points such as a base station 104, a satellite 106, a wireless access point (WAP) 108, Bluetooth (BT) headset 110, and/or other commutation devices through the use of wireless signals 102, which may be, for example, radio signals.

The wireless device 100 may be cellular phone, wireless media device, or other device capable of receiving and/or transmitting a radio or other wireless signal 102. For example, the wireless device 100 may be a personal digital assistant (PDA), a portable computing device capable of wireless communication, a media player device, a portable gaming device, a personal computer, a wireless access point (WAP) and/or any other suitable device.

The environment for the device includes a number of devices that send signals that potentially cause interference. In one example, the environment is crowded and includes multiple base stations, such as the station 104, other mobile devices and the like. The environment results in one or more interference signals 114 that are unintentionally received by the device 100.

The wireless device 100 includes one or more antennas 112 that may be configured for communication with the base station 104, satellite 106, WAP 108, BT headset 110, and so forth. For example, the wireless device 100 may communicate using a GSM or UMTS technology with the base station 104 as part of a cellular network, in which the base station 102 represents a cellular phone tower or other device capable of transmitting and/or receiving one or more radio or other wireless signals 102 within a cell of a cellular network. The wireless device 100 may also communicate with the BT headset 110 using a BT mode for transmitting and receiving. The wireless device 100 may additionally or alternatively communicate with other communication points using one or more antennas 112, which may be configured as a multimode (MM)/multiple-input multiple-output (MIMO)/multiple-input single-output (MISO), and/or single-input multiple-output (SIMO) system to transmit and/or receive one or more signals 102 in one or more modes.

The wireless device 100 performs an internal calibration in an internal calibration mode in order to mitigate noise or interference due to the interference signals 114. A receiving antenna of the antennas 112 is mismatched to mitigate or reduce levels of noise/interference. Subsequently, the calibration, such as second order intermodulation (IM2) calibration is performed. Thereafter, communication is performed with enhanced performance and mitigated interference in a standard mode.

Figure 2:
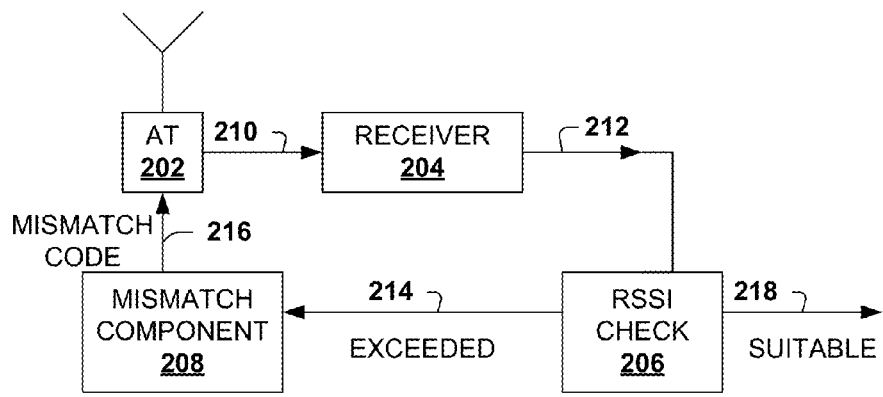
FIG. 2 is a block diagram illustrating a communication system having an antenna tuner to enhance range and communications.

FIG. 2 is a block diagram illustrating a communication system 200 having an antenna tuner to enhance range and communications. During an internal calibration mode, the system 200 tunes an antenna to decrease or mitigate interference in environments, including crowded environments. The interference is mitigated prior performing an internal calibration procedure. Some components are omitted to facilitate understanding. The system 200 is described prior to performing the internal or self calibration.

The system 200 includes an antenna tuner 202, a receiver chain 204, a signal strength indicator 206 and a mismatch component 208. The antenna tuner 202 is controllable and is configured to tune an antenna according to a code or input. Typically, the antenna tuner 202 is configured to improve matching between the receiver 204 and the antenna. However, for internal calibration, the antenna tuner 202 is also used to mismatch the antenna with the receiver 204 and isolate the receiver 204 from the crowded environment. In order to improve matching or mismatch the antenna with the receiver 204, the antenna tuner 202 tunes the antenna to have selected antenna parameters, such as impedance. In one example, for standard communications or a standard mode, the antenna tuner 202 sets the antenna to a matching impedance with the receiver 204. In another example, for an internal calibration mode, the antenna tuner 202 sets the antenna to a mismatched impedance with the receiver 204.

A transmitter (not shown) may be present, but is typically disconnected by a switch during a pre-calibration portion. A transmitter is partly used for performing the internal calibration after the pre-calibration portion.

The antenna tuner 202 is configured to obtain an incoming signal 210 from the antenna and provides the incoming signal 210 as an output. Properties of the incoming signal 210 vary according to the tuning performed by the antenna tuner.

The receiver chain 204 receives the incoming signal 210 and provides a received signal 212. The received signal 212 is based on a communications technology, such as, GSM, UMTS, Bluetooth, FM radio, WiFi, and the like. The receiver 204 includes components, such as, a filter, linear amplifier, multiplier (used to demodulate with a local oscillator signal), an analog to digital converter, and the like. In one example, the filter, linear amplifier, multiplier, and analog to digital converter are connected in series. It is appreciated that variations in the receiver chain 204 are contemplated.

In one example, the received signal 212 is a digital signal. For this example, the incoming signal is processed and converted to digital using an analog to digital converter.

The signal strength indicator 206 is configured to measure a whole signal strength of the received signal 212. The measured strength indicates characteristics about the strength of the received signal 212. The strength is measured relatively fast, such as in a few microseconds.

The signal strength indicator 206 can be utilized for other purposes during communications for the standard mode.

The signal strength indicator 206 can be configured to provide the measured strength as an output and/or provide the strength to other components of the system 200. Additionally, the indicator 206 is configured to compare the measured strength/interference with a channel threshold value. If the comparison indicates that the measured strength is suitable, a signal 218 indicating that it is suitable is generated. Otherwise, if the channel threshold value is exceeded by the measured strength, an exceeded signal 214 is generated that indicates that there is too much interference or noise.

The channel threshold value can vary on implementation. In one example, the threshold value is based on a selected channel used for receiving or a selected channel bandwidth.

The mismatch component 208 is configured to provide a mismatch code 216 to the antenna tuner 202. The mismatch code 216 directs the antenna tuner 202 to alter one or more antenna parameters.

In one example, the mismatch component 208 includes a lookup table with an array or list of mismatch codes. On receiving the exceeded signal 214, the mismatch component 208 selects an unused code from the list of codes and provides the selected code as the mismatch code 216.

The incoming signal 210 is altered as a result of the mismatch code 216, which alters the received signal 212 and the measured strength indicator of the received signal. The mismatch component 208 iteratively provides unused mismatch codes as the mismatch code 216 until the measured strength indicator is acceptable. At this point, the suitable signal 218 is generated.

Figure 3:
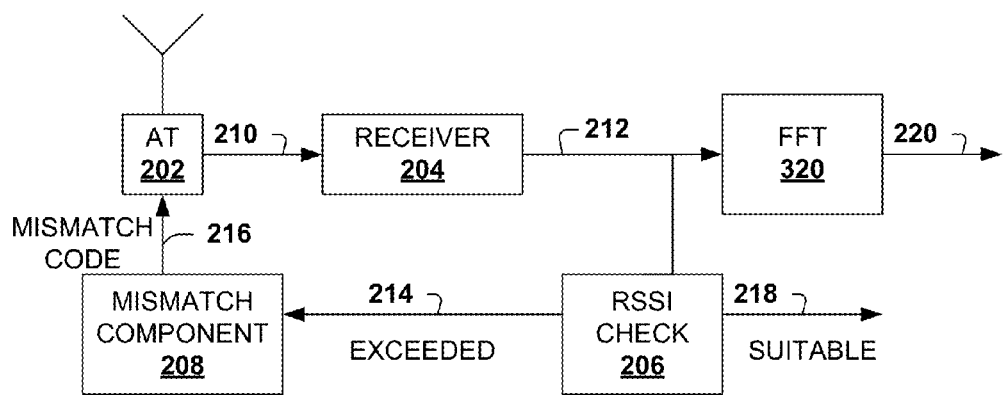
FIG. 3 is a block diagram illustrating a communication system having an antenna tuner to enhance range and communications.

FIG. 3 is a block diagram illustrating a communication system 300 having an antenna tuner to enhance range and communications. The system 300 tunes an antenna to decrease or mitigate interference in environments, including crowded environments. The interference is mitigated prior to performing an internal calibration procedure. Some components are omitted to facilitate understanding. The system 300 is substantially similar to the system 200 described above.

The system 300 is described at the time when the mismatch code 216 has been applied and resulted in the signal strength indicator 206 generating the suitable signal 218. Thus, the antenna tuner 202 has mismatched the antenna such that the received signal has a suitable strength exceeding the channel threshold.

The system 300 includes the components of the system 200 and additionally includes a measuring unit 320. The measuring unit 320 is a fast Fourier transform (FFT) unit and provides an output level 220 based on the received signal 212. The output level 220 is initially used in the pre-calibration portion to determine if it is suitable for the internal calibration to be performed.

Generally, once the system 300 has provided a suitable mismatch code to the antenna tuner 202, the signal strength indicator 206 generates the suitable signal 218, which indicates that the signal strength is suitable for calibration to be performed. At this point, the measuring unit 320 provides a measurement 220, referred to as an output level 220 based on the received signal 212.

Once the suitable signal 218 has been generated, the output level 220 is compared with another threshold value, a pre-calibration level threshold or FFT threshold. If the output level 220 is below the level threshold, an internal signal for injection is increased iteratively until the output level 220 is at or above the level threshold.

If the output level 220 is at or above the level threshold, the internal calibration process can be performed. In one example, the measuring unit 320 generates a signal indicating that the calibration process can be performed. In another example, a different component, such as a controller, performs the calibration process on the output level 220 being at or above the level threshold.

Figure 4:
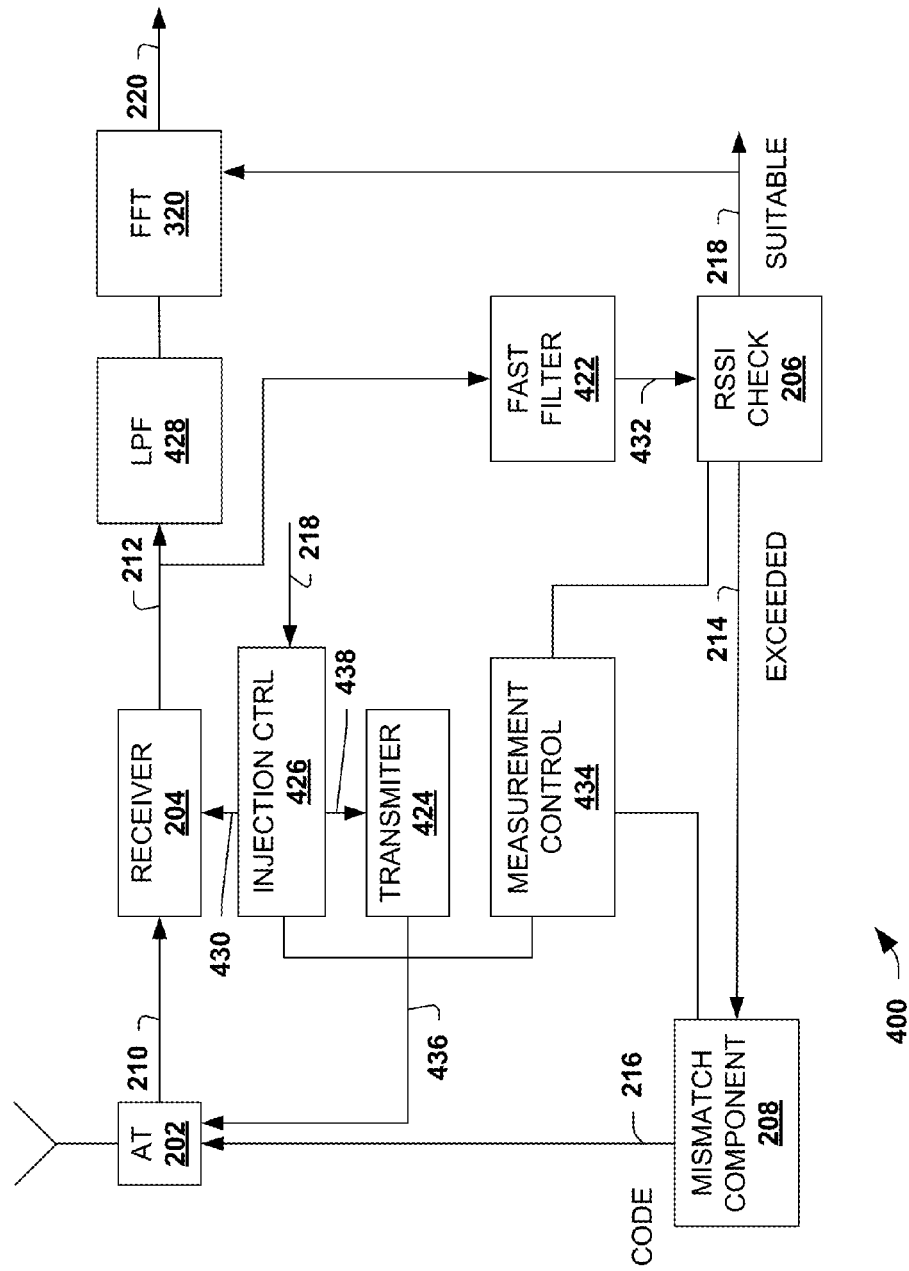
FIG. 4 is a block diagram illustrating a communication system having an antenna tuner and performing internal calibration to enhance range and communications.

FIG. 4 is a block diagram illustrating a communication system 400 having an antenna tuner and performing calibration to enhance range and quality of communications. The system 400 tunes an antenna to decrease or mitigate interference in environments, including crowded environments. The interference is mitigated prior performing an internal calibration procedure. Once appropriately tuned, internal calibration is performed by selected injections into a transmit path. The system 400 is substantially similar to the system 300 described above.

The system 400 includes an antenna tuner 202, a receiver chain 204, a signal strength indicator 206, a mismatch component 208, a low pass filter 428, a measuring unit 320, a fast filter 422, a transmitter 424, an injection control component 426 and a common control unit 434. For additional description of like numbered elements, see the description for systems 200 and 300, described above.

The antenna tuner 202 is controllable and is configured to tune an antenna according to a code or input. The antenna tuner 202 tunes the antenna to have selected antenna parameters, such as impedance. The antenna tuner 202 is configured to obtain an incoming signal 210 from the antenna and provides the incoming signal 210 as an output. Properties of the incoming signal 210 vary according to the tuning performed by the antenna tuner.

The receiver chain 204 receives the incoming signal 210 and provides a received signal 212. The received signal 212 is based on a communications technology, such as, GSM, UMTS, Bluetooth, FM radio, WiFi, and the like.

The fast filter 422 filters the received signal 212 according to a selected channel or bandwidth. The fast filter 422 outputs the filtered received signal 432, which is then provided to the signal strength indicator 206. The filter 422 is used with communication technologies such as 2G, 3G and the like. For a 3G example, the channel size/range is about 3.84 MHz. For a LTE example, the channel range is from 1 to about 20 MHz.

It is also appreciated that the fast filter 422 is adjustable. The filter 422 is adjusted for channel bandwidth.

The signal strength indicator 206 is configured to measure a signal strength of the received signal 212 via the filtered signal 432. The strength is measured relatively fast, such as in a few microseconds. Generally, the measurement is digital.

The signal strength indicator 206 can be configured to provide the measured strength as an output and/or provide the strength to other components of the system 400, such as the control unit 434. The indicator 206 is configured to compare the measured strength/interference with a strength or channel threshold value. If the comparison indicates that the measured strength is suitable, a signal 218 indicating that it is suitable is generated. Otherwise, if the threshold value is exceeded by the measured strength, an exceeded signal 214 is generated that indicates that there is too much interference or noise.

The channel threshold value can vary on implementation. In one example, the threshold value is based on a selected channel used for receiving or a selected channel bandwidth. The channel threshold value corresponds to a maximum interference signal from the antenna. Values below the channel threshold value are suitable, values above are not suitable and lead to invalid calibration.

The mismatch component 208 is configured to provide a mismatch code 216 to the antenna tuner 202. The mismatch code 216 directs the antenna tuner 202 to alter one or more antenna parameters. The purpose of the mismatch code 216 is to mitigate interference and unwanted signals from other components, such as base stations. The mismatch code 216 mismatches the antenna tuner 202 with the other components, such as base stations, in order to mitigate their impact on the incoming signal 210 and the received signal 212.

In one example, the mismatch component 208 includes a lookup table with an array or list of mismatch codes. On receiving the exceeded signal 214, the mismatch component 208 selects a code from the list of codes and provides the selected code as the mismatch code 216. The number of codes in the list can vary. In one example, the list of codes includes 10 to 20 mismatch codes. The codes can be frequency dependent, in one example.

The incoming signal 210 is altered as a result of the mismatch code 216, which alters the received signal 212 and the measured strength indicator of the received signal. The mismatch component 208 iteratively provides another mismatch codes as the mismatch code 216 until the measured strength indicator is acceptable. At this point, the suitable signal 218 is generated.

It is appreciated that varied environments will have varying levels and amounts of interference present. Thus, a mismatch code 216 that provides a suitable strength indicator in one environment may not be suitable in another environment.

The low pass filter 428 filters the received signal 212 over a narrow frequency range. In one example, the low pass filter 428 removes portions from the signal 212 so that only a small frequency range of about 10 kHz remains. The range or passband corresponds to a frequency of a wanted signal. The low pass filter 428 is a relatively slow filter due to the narrower range. In one example, the filter 428 is a 10 kHz low pass filter and requires about 100 micro-seconds to filter the signal 212. In contrast, the fast filter 422 typically filters in a couple micro seconds, in one example.

The measuring unit 320 is a fast Fourier transform (FFT) unit and provides a measured level 220 based on the received signal 212. The output level 220 is initially used in the pre-calibration portion to determine if it is suitable for calibration to be performed.

Once the suitable signal 218 has been generated, the measured level 220 is compared with a pre-calibration level threshold, also referred to as an FFT threshold. If the level 220 is below the threshold, the signal 436 is increased until the output level 220 is at or above the level threshold. In one example, the signal 436 includes injected intermodulation components.

If the output level 220 is at or above the level threshold, the internal calibration process is performed. The injection control component 426 configures transmitter 424 to inject intermodulation components via signal 436 into a receiver 204.

In one example, the measuring unit 320 generates a signal indicating that the internal calibration process can be performed. In another example, a different component, such as a controller, performs the calibration process on the output level 220 being at or above the level threshold.

Generally, calibration or intermodulation calibration is performed by determining a suitable injection level, obtaining sweep measurements for the injection level and then developing calibration adjustments and saving the calibration results, which includes the adjustments, measurements and environment parameters. The parameters include temperature, supply voltages, frequencies and the like. In one example, the calibration is second order intermodulation calibration (IM2).

The injection control component 426 controls the transmitter 424 by a digital control signal 438. Additionally, the injection control 426 sets the receiver 204 into the standard mode for normal communications or the internal calibration mode for performing internal calibrations.

The injection component 426 controls injection of transmission components into a transmit signal 436 and starts at a first or minimum level, proceeds by a step value, and finishes at a second or maximum value. Generally, the injected components start at the minimum value to use less power. The measurement 220 for the initial injection is compared to a FFT threshold. If the measurement 220 is no greater than the FFT threshold, the level of the transmission component is increased. If the level of the transmission component is greater than or equal to a maximum value, calibration is halted. Otherwise, the injection control component 426 proceeds to a next value and compares a measurement 220 for the next value until an injected component is identified that is greater than the FFT threshold. Thus, the injection control component 426 step wise increases the power of the injected transmission component until the measurement is suitably visible.

Once the FFT threshold is exceeded, a measurement sweep is initiated by the control component 434 and sweep measurements are obtained by the measurement component 320. A plurality of measurements are provided as an output 220 by the component 320 as a result of the sweep. The measurements obtained during the sweep, referred to as sweep measurements, are used to calibrate the system 400. This calibration includes identifying and saving new calibrated values, time stamps, temperature stamps, frequencies, and the like.

The internal calibration can be performed/repeated at suitable times. In one example, a new location is detected and the calibration is re-performed. In another example, a change in temperature is detected and the internal calibration is performed again.

Figure 5A:
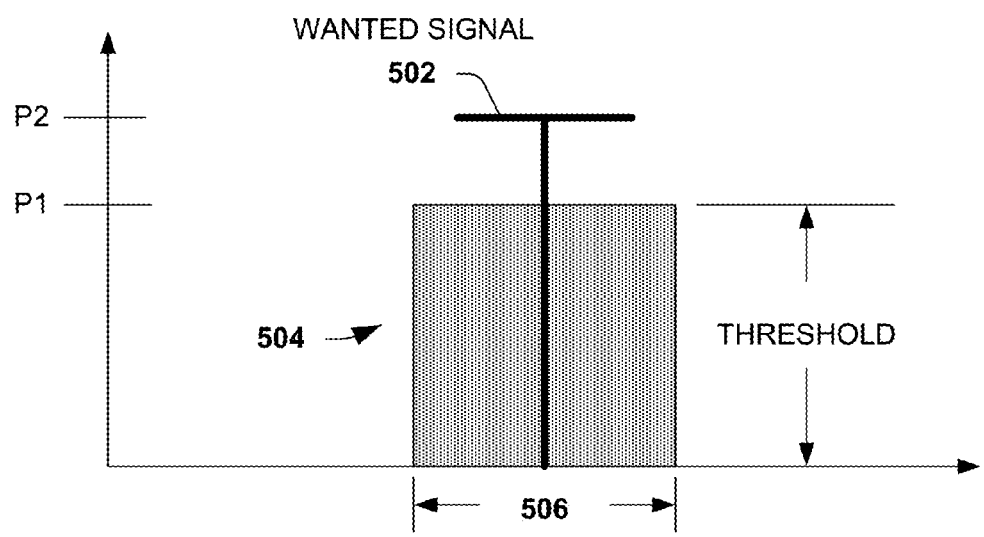
FIG. 5A is a graph illustrating filtering by a low pass filter.

FIG. 5A is a graph illustrating filtering by a low pass filter. The graph shows a filtered received signal 504 that has been filtered by the low pass filter. The filtered receive signal includes a wanted signal 502. The low pass filter is configured to pass filter for a selected narrow frequency range 506 as shown in FIG. 5A. It can be seen that a measured value is at or below a threshold P1, also referred to as an FFT threshold or level threshold. As a result, internal calibration is possible. If the measured value exceeded P1, there would be too much interference and any calibration process would likely be invalid and/or inaccurate.

Figure 5B:
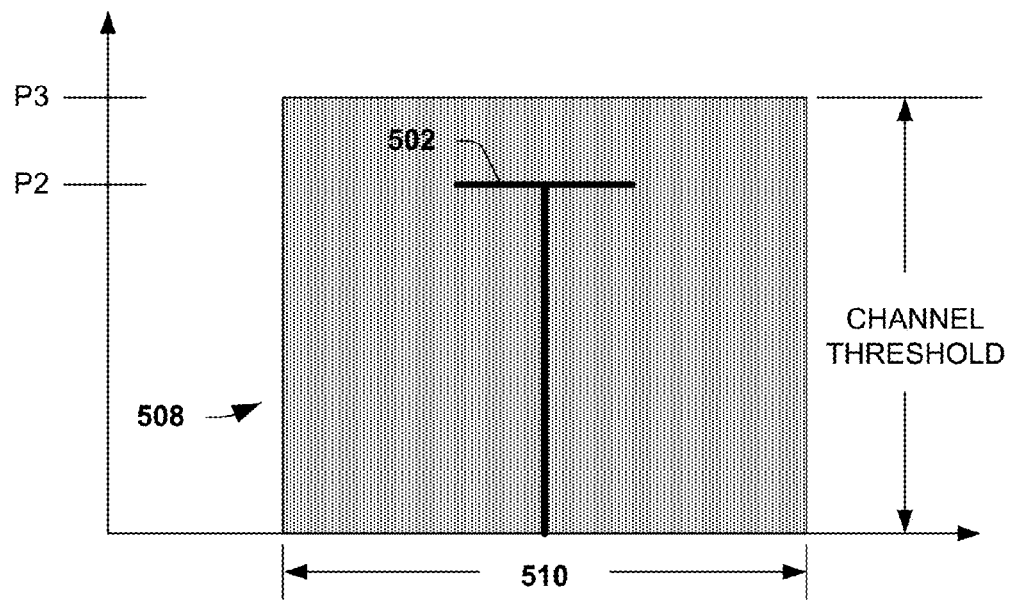
FIG. 5B is a graph illustrating filtering by a fast filter.

FIG. 5B is a graph illustrating filtering by a fast filter. The graph depicts a filtered signal 508 which has been filtered by the fast filter, such as the filter 422 described above. The remaining signal 508 has a wider frequency band, which is the channel width 510. Here, the channel threshold is set to a value greater than the wanted signal 502. The channel threshold is typically set to an amount that includes the wanted signal 502.

Figure 6:
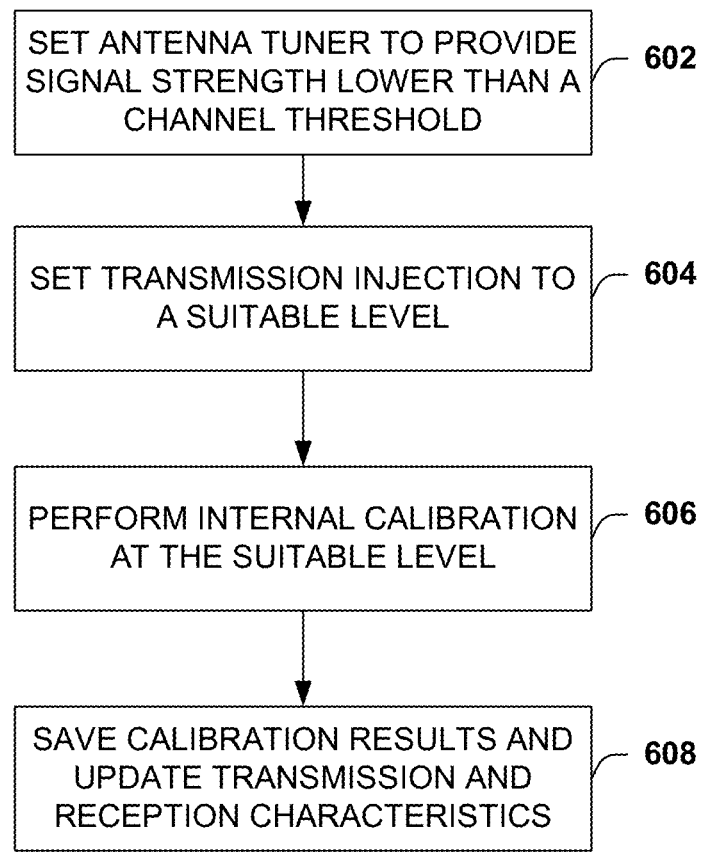
FIG. 6 is a flow diagram illustrating a method of configuring and performing intermodulation internal calibration with a communication system.

FIG. 6 is a flow diagram illustrating a method 600 of configuring and performing internal calibration with a communication system. The method 600 utilizes an antenna tuner to mismatch an antenna to obtain a suitable signal during a pre-calibration portion. Generally, the method 600 can be performed by a system and a controller, such as the system 400 with the common control unit 434.

A mismatch component configures an antenna tuner to provide a signal strength lower than a channel threshold at block 602. The mismatch component, such as the component 208 described above, provides a mismatch code to the antenna tuner. The mismatch code is a code from a list of mismatch codes. The antenna tuner uses the mismatch code to configure or mismatch an antenna to obtain a received signal having a wanted signal and a suitable strength. The antenna tuner configures the antenna to have varied characteristics, such as a varied impedance based on the supplied mismatch code.

A control unit configures an injection component to have injection set to a suitable level at block 604. Generally, the injection component is configured to set injection to a first or minimum level and a measuring unit, such as the measuring unit 320, is used to measure the received signal. If the measurement exceeds an FFT threshold value, calibration can be performed. If not, the level is increased by a step amount and measurements of the received signal are obtained until the measurement exceeds the FFT threshold value.

The control unit performs calibration at block 606. The calibration is performed by injecting or sweeping various known values with the injection component and measuring the filtered signal by the measuring unit. The measured values are also referred to as sweep values.

The control unit saves calibration results at block 608. The results can then be utilized to modify/configure the communication characteristics, such as frequency, bandwidth, transmission power, and the like.

The method 600 can be performed or repeated at regular intervals and/or on changes in the environment. In one example, the method 600 is performed on a location change. In another example, the method 600 is performed upon a change in temperature, such as an internal temperature of a mobile device.

Figure 7:
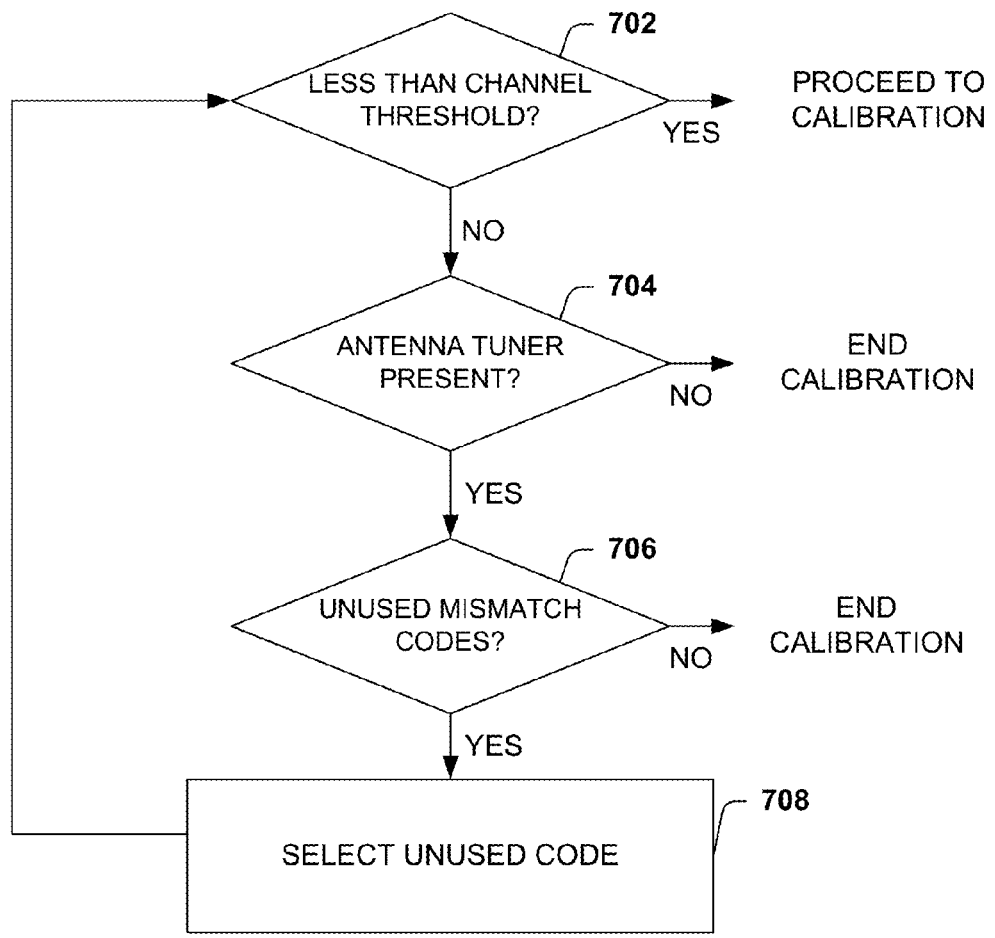
FIG. 7 is a flow diagram illustrating a method of configuring an antenna tuner.

FIG. 7 is a flow diagram illustrating a method 700 of configuring an antenna tuner. The method 700 can be used for performing the block 602 of the method 600. The method 700 is performed with a communication system, such as the system 400 described above.

A signal strength indicator measures a signal strength of a received signal at block 702. A fast filter filters the received signal, such as shown in FIG. 5B, prior to measuring the signal strength. The measured signal strength indicates a strength of the received signal and is compared with a channel threshold. If the strength is suitable, calibration can be performed via a suitable technique, such as proceeding to block 604 of the method 600. A control unit compares the signal strength with the channel threshold.

On the signal strength being above than the channel threshold, the control unit determines if an antenna tuner is present (block 704). If the antenna tuner is not present, the method 700 stops and calibration is not performed. If the antenna tuner is present, the method 700 continues to block 706.

The control unit determines if there are any unused mismatch codes for the antenna tuner at block 706. Typically, there is a list of mismatch codes stored within or by the mismatch component. As the codes are used, they may be marked as used. If there are no unused mismatch codes, the method 700 stops and calibration is not performed. Otherwise, the method 700 continues to block 708. It is noted that subsequent internal calibrations re-use the mismatch codes.

The control unit selects an unused mismatch code at block 708 and provides the selected code to the antenna tuner. Then, the method 700 proceeds to block 702. In one example, the code is a next unused code in the list of available codes. In another example, the code is selected randomly. Once selected, the code is marked as used in the list of available codes.

The antenna tuner configures the antenna according to the selected code. This modifies the characteristics and strength of the received signal.

The method 700 then proceeds back to block 702, where the received signal, which has been adjusted, is measured and compared with the channel threshold.

Figure 8:
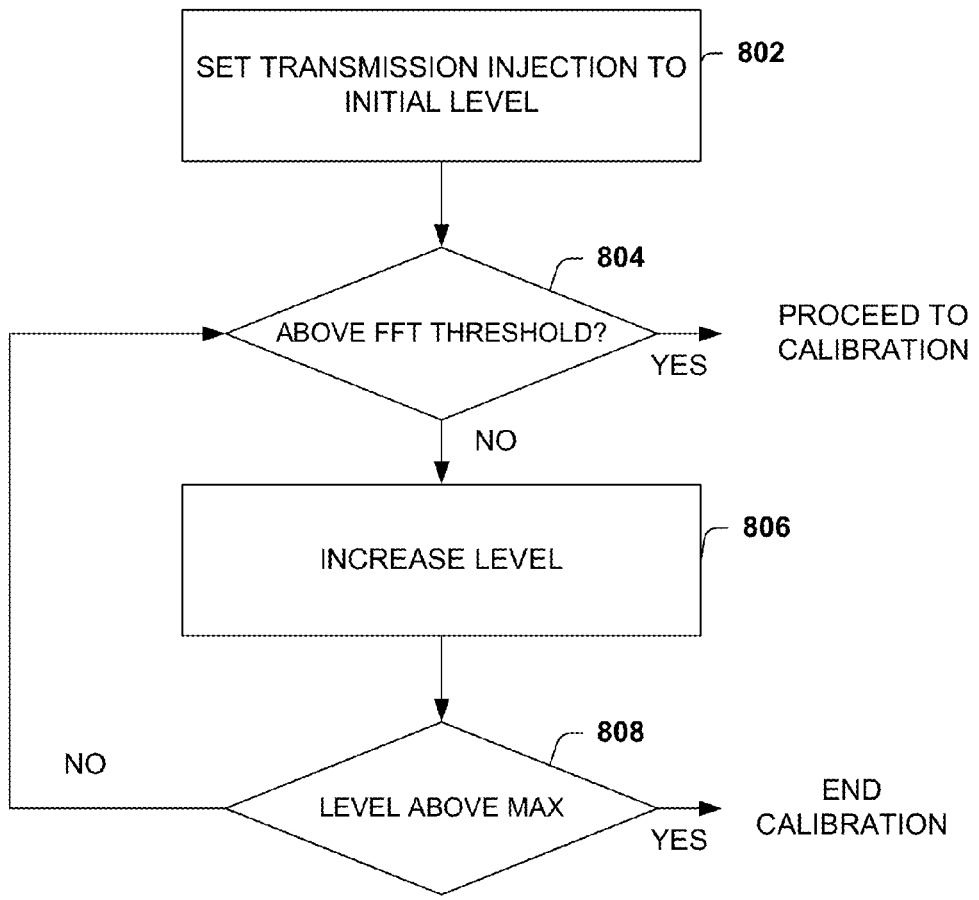
FIG. 8 is a method of configuring transmission injection for a communication system.

FIG. 8 is a method 800 of configuring transmission injection for a communication system. The method 800 sets a level for injection and precedes performing calibration.

An injection unit is set to an injection level at a first or initial level at block 802. In one example, the initial level is a minimum level at which injection can be performed. The injection unit injects a signal at the injection level into a transmitter or transmission signal. Additionally, a received signal is provided by a receiver based on an incoming signal from an antenna tuner. The received signal is altered due to the injected signal.

A measurement unit measures the received signal at block 804. The received signal is typically filtered by a low pass filter prior to being measured. FIG. 5A provides an example of a suitable filtering. In one example, the measurement unit is a fast Fourier transform unit. If the injection measurement is above a threshold, an internal calibration process can be performed. Otherwise, the method 800 continues to block 806.

The injection level is increased by a step amount at block 806 to yield an adjusted injection level. The adjusted injection level is compared with a permitted or maximum injection level at block 808. If the adjusted injection level is below or at the permitted injection level, the method 800 continues to block 804, where another measurement is obtained.

Figure 9:
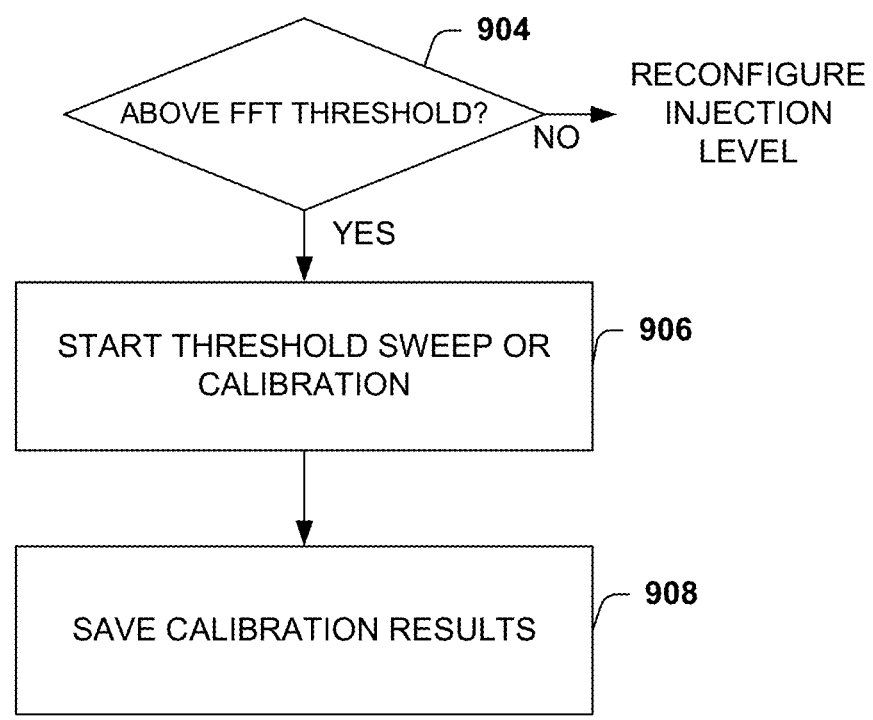
FIG. 9 is a flow diagram illustrating a method of performing internal calibration of a communication system.

FIG. 9 is a flow diagram illustrating a method 900 of performing internal calibration of a communication system. The method 900 is performed after a suitable mismatch code has been used by an antenna tuner and after an injection level has been set for an injection component. The suitable mismatch code can be identified using the method 700 and the injection level and be set using the method 800, as described above. The method 900 can be utilized to perform the calibration of block 606, described above with regards to the method 600.

A measuring unit measures a filtered received signal at block 904. If the measurement is above or at a permitted injection level, the method 900 continues to block 906. If the measurement is below the permitted injection level, the injection level can be reconfigured using a technique, such as the method 800, and performed again. Alternately, the calibration can be ended. An example of a suitable measuring unit is the FFT unit 320 of FIG. 3.

At block 906, an injection unit initiates a sweep at an injection level. The sweep includes injecting one or more signals into a transmission path or transmission signal. The injected signal or at least components of the injected signal, become part of the received signal and are measured by the measuring unit. The measurements are used for calibration, such as at block 608 of the method 600, described above.

The calibration results, including the measurements, are saved at block 908. The results may include time, temperature, location, frequency range/channel adjustments, and the like.

In one example, the method 900 performs second order intermodulation calibration. Other calibration techniques can also be performed.

While the methods provided herein are illustrated and described as a series of acts or events, the present disclosure is not limited by the illustrated ordering of such acts or events. For example, some acts may occur in different orders and/or concurrently with other acts or events apart from those illustrated and/or described herein. In addition, not all illustrated acts are required and the waveform shapes are merely illustrative and other waveforms may vary significantly from those illustrated. Further, one or more of the acts depicted herein may be carried out in one or more separate acts or phases.

It is noted that the claimed subject matter may be implemented as a method, apparatus, or article of manufacture using standard programming and/or engineering techniques to produce software, firmware, hardware, or any combination thereof to control a computer to implement the disclosed subject matter (e.g., the systems shown above, are non-limiting examples of circuits that may be used to implement disclosed methods and/or variations thereof). The term "article of manufacture" as used herein is intended to encompass a computer program accessible from any computer-readable device, carrier, or media. Those skilled in the art will recognize many modifications may be made to this configuration without departing from the scope or spirit of the disclosed subject matter.

Examples may include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a communication system having internal calibration or self calibration. The system includes an antenna tuner, a mismatch component, a receiver, and a strength indicator. The antenna tuner is configured to mismatch an antenna according to a mismatch code. The mismatch code includes or alters antenna characteristics of the antenna. The mismatch component is configured to provide the mismatch code to the antenna tuner. The strength indicator is configured to measure a strength of the received signal.

Example 2 is a system including the subject matter of Example 1, where the mismatch component includes a list of available mismatch codes.

Example 3 is a system including the subject matter of Examples 1-2, including or omitting features, where the antenna tuner is configured to alter an impedance of the antenna according to the mismatch code.

Example 4 is a system including the subject matter of Examples 1-3, including or omitting features, where the antenna tuner is configured to obtain an incoming signal and the incoming signal varies in response to the mismatch code.

Example 5 is a system including the subject matter of Examples 1-4, including or omitting features, where the received signal includes a wanted signal and interference.

Example 6 is a system including the subject matter of Examples 1-5, including or omitting features, where the mismatch component is configured to select the mismatch code that yields the strength above a channel threshold.

Example 7 is a system including the subject matter of Examples 1-6, including or omitting features, where the strength indicator compares the measured strength to a channel threshold.

Example 8 is a system including the subject matter of Examples 1-7, including or omitting features, where the mismatch component is configured to select an unused mismatch code from a list of unused mismatch codes on the measured strength being below the channel threshold.

Example 9 is a system including the subject matter of Examples 1-8, including or omitting features, further including a transmitter coupled to an output of the antenna tuner and configured to provide a transmit signal.

Example 10 is a system including the subject matter of Examples 1-9, including or omitting features, where the system additionally includes an injection component configured to inject signals into the transmit signal.

Example 11 is a system including the subject matter of Examples 1-10, including or omitting features, where the injection component is configured to identify an injection level for calibration.

Example 12 is a system including the subject matter of Examples 1-11, including or omitting features, where the injection component is configured to inject signals for calibration.

Example 13 is a communications system having internal calibration. The system includes an antenna tuner, a receiver, a transmitter, and an injection control component. The antenna tuner is configured to mismatch an antenna according to a mismatch code. The mismatch code includes antenna characteristics and the mismatch code corresponds to a suitable signal strength. The receiver is coupled to the antenna tuner and configured to provide a received signal. The received signal includes a wanted signal. The transmitter is coupled to the antenna tuner and is configured to provide a transmission signal. The injection control component is configured to inject calibration signals into the transmission signal.

Example 14 is a system including the subject matter of Example 13, including or omitting features, where the system also includes a low pass filter configured to filter the received signal according to a narrow frequency range.

Example 15 is a system including the subject matter of Examples 13-14, including or omitting features, where the system also includes a measuring unit coupled to the low pass filter and configured to measure the received signal from the low pass filter.

Example 16 is a system including the subject matter of Examples 13-15, including or omitting features, where the system includes a strength indicator configured to measure a strength of the received signal.

Example 17 is a system including the subject matter of Examples 13-16, including or omitting features, where the system includes a control unit coupled to the strength indicator. The control unit is configured to select the mismatch code based on the strength from the strength indicator prior to enabling the injection control component to inject calibration signals.

Example 18 is a method of configuring a communication system for internal calibration. An antenna tuner is configured to mismatch an antenna to provide a received signal having a selected strength. A transmission signal is set to an injection level. Signals for calibration are injected into the transmission signal using the injection level.

Example 19 is a method including the subject matter of Example 18, including or omitting features, where the antenna tuner is configured by applying one or more codes to the antenna tuner until a strength of the received signal exceeds a channel threshold.

Example 20 is a method including the subject matter of Examples 18-19, including or omitting features, where measurements of the received signal are obtained after injecting the signals for calibration.

Example 21 is a method including the subject matter of Examples 18-20, including or omitting features, where the system is calibrated based on the obtained measurements and calibration results are saved.

Although the invention has been illustrated and described with respect to one or more implementations, alterations and/or modifications may be made to the illustrated examples without departing from the spirit and scope of the appended claims. For example, although a transmission circuit/system described herein may have been illustrated as a transmitter circuit, one of ordinary skill in the art will appreciate that the invention provided herein may be applied to transceiver circuits as well.

Furthermore, in particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. The any component or structure includes a processer executing instructions in order to perform at least portions of the various functions. In addition, while a particular feature of the invention may have been disclosed with respect to only one of several implementations, such feature may be combined with one or more other features of the other implementations as may be desired and advantageous for any given or particular application.

Furthermore, to the extent that the terms "including", "includes", "having", "has", "with", or variants thereof are used in either the detailed description and the claims, such terms are intended to be inclusive in a manner similar to the term "comprising".

What is claimed is:

1. A communication system having internal calibration, the system comprising:
    an antenna tuner configured to alter an amount of mismatch associated with an antenna when coupled thereto in a pre-calibration mode according to a received mismatch code, wherein the mismatch code defines one or more antenna characteristics;
    a mismatch component configured to provide one of a plurality of available mismatch codes to the antenna tuner as the received mismatch code in response to receipt of a first control signal;
    a receiver coupled to the antenna tuner and configured to provide a received signal in response to receipt of an incoming signal from the antenna tuner; and
    a strength indicator configured to measure a strength of the received signal and output the first control signal if the measured strength exceeds a predetermined channel threshold value indicating too much interference or noise and thus a need to create a greater amount of mismatch to further reduce the interference or noise, and output a second, different control signal if the measured strength does not exceed the predetermined channel threshold value,
    wherein outputting the second control signal indicates that sufficient mismatch exists to isolate the receiver from the interference or noise with the provided mismatch code, and to proceed with an internal calibration procedure.

2. The system of claim 1, wherein the antenna tuner is configured to obtain the incoming signal, where the incoming signal varies in response to a change in the mismatch code by the mismatch component upon receipt of the first control signal when a previous or an initial mismatch code produced insufficient mismatch resulting in too much interference or noise.

3. The system of claim 1, wherein the received signal includes a wanted signal and interference.

4. The system of claim 1, wherein upon receipt of the first control signal the mismatch component is configured to select another one of the plurality of mismatch codes and repeat the selecting of mismatch codes until the measured strength of the received signal no longer exceeds the predetermined channel threshold value, at which time the strength indicator outputs the second control signal, thus indicating sufficient mismatch exists to isolate the receiver from the interference or noise with the selected mismatch code.

5. The system of claim 1, further comprising a transmitter configured to provide a transmit signal to the receiver upon receipt of the second control signal.

6. The system of claim 5, further comprising an injection component configured to inject signals into the transmit signal to form an injected transmit signal that is provided to the receiver to form the received signal for the subsequent internal calibration procedure.

7. The system of claim 6, further comprising:
- a measuring unit coupled to an output of the receiver and configured to measure the received signal output from the receiver, compare a value of the received signal with a threshold, and provide a comparison result in response thereto,
- wherein the injection component is configured to identify an injection level for the inject signals for the subsequent calibration procedure by evaluating the comparison result,
- wherein if the value of the received signal exceeds the threshold the injection level is sufficient for the subsequent calibration, and if the value of the received signal does not exceed the threshold the injection level is incrementally increased until the value of the received signal exceeds the threshold.

8. A communications system having an internal calibration mode, the system comprising:
- an antenna tuner configured to alter an amount of mismatch associated with an antenna according to a mismatch code, wherein the mismatch code defines one or more antenna characteristics;
- a receiver coupled to the antenna tuner and configured to receive an incoming signal from the antenna tuner and provide a received signal in response thereto, the received signal including a wanted signal and interference;
- a mismatch component configured to provide one of a plurality of mismatch codes to the antenna tuner, in response to receipt of a first control signal; and
- a strength indicator configured to receive the received signal and provide an indication when a value of the received signal is less than a predetermined channel threshold value;
- a control unit configured to generate the first control signal and provide the first control signal to the mismatch component to select another mismatch code from the plurality of mismatch codes until receipt of the indication from the strength indicator, upon which receipt the control unit generates a second, different control signal;
- a transmitter configured to provide a transmission signal to the receiver upon receipt of the second control signal; and
- an injection component configured to iteratively inject signals into the transmission signal of incrementally greater value until a value of the received signal exceeds a threshold, thereby identifying an injection level for the subsequent internal calibration mode.

9. The system of claim 8, further comprising a low pass filter configured to filter the received signal according to a narrow frequency range.

10. A method of configuring a communications system for internal calibration, the method comprising:
- configuring an antenna tuner to mismatch an antenna when coupled thereto, wherein the resultant antenna mismatch is sufficient to provide a received signal from a receiver coupled to the antenna tuner having a strength less than a predetermined channel threshold value;
- setting an injection component to an injection level in a transmitter that provides the injection component to the receiver that is coupled to the configured antenna tuner, the injection level being incrementally increased until the resulting received signal exceeds a threshold; and
- injecting signals for calibration using the resultant injection level into a transmission signal.

11. The method of claim 10, wherein configuring the antenna tuner includes applying different mismatch codes to the antenna tuner until a strength of the received signal has a strength that falls below the predetermined channel threshold.

12. The method of claim 10, further comprising obtaining measurements of the received signal after injecting the signals for calibration.

* * * * *